UNITED STATES PATENT OFFICE.

WALTER SCHOELLER AND WALTHER SCHRAUTH, OF BERLIN, GERMANY, ASSIGNORS TO FARBENFABRIKEN VORM. FRIEDR. BAYER & CO., OF ELBERFELD, GERMANY, A CORPORATION OF GERMANY.

PRESERVATIVE COATING COMPOSITION.

1,087,145. Specification of Letters Patent. Patented Feb. 17, 1914.

No Drawing. Application filed April 9, 1912. Serial No. 689,623.

*To all whom it may concern:*

Be it known that we, WALTER SCHOELLER and WALTHER SCHRAUTH, doctors of philosophy, chemists, citizens of the German Empire, residing at Berlin, Germany, have invented new and useful Improvements in Preservative Coating Compositions, of which the following is a specification.

The present invention relates to coating materials made with mercury compounds of halogen-phenols and more particularly those made with the oxymercuric substances obtained from halogen-phenols. These bodies of the following graphically represented formula:

(R meaning a halogen substituted benzene nucleus) are obtained e. g. by heating molecular proportions of mercuric sulfate and halogen-phenols in aqueous solution. The anhydrid of oxy-mercuric-ortho-chlor-phenol, produced from ortho-chlor-phenol, has the following graphically represented formula:

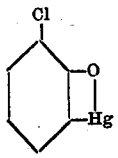

In the form of its monovalent metal compounds it has the following graphically represented formula:

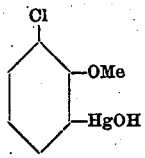

(Me standing for the metal) and in the form of its divalent metal compounds it has that represented by the following formula:

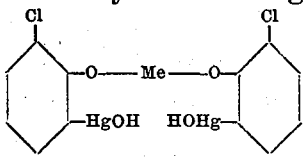

(Me standing for the metal.) The thus obtained anhydrids of halogen-phenols separate in crystalline form and are completely insoluble in water. The crystals are then mixed to the extent of about 2 per cent. with any of the varnishes generally employed to ship's bottom and furnish coatings of remarkable preserving properties. Instead of the sulfate of mercury other mercury salts for instance the acetate of mercury can be used. Instead of the anhydrids themselves we may employ as additions to the varnishes the salts of these anhydrids made with heavy metals such as copper, lead, zinc, etc., as described in our application No. 568,103, filed June 21, 1910.

The term mercury derivative of a halogen-phenol is used in the following claims to include not only the anhydrids but also the metal salts of these anhydrids such as those already referred to.

We claim:—

1. A coating material comprising a mercury derivative of a halogen-phenol in conjunction with a suitable vehicle, substantially as described.

2. A coating material comprising an oxy-mercuric-halogen-phenol substance in conjunction with a suitable vehicle, substantially as described.

3. A coating material comprising the anhydrids of oxymercuric-halogen-phenols of the following graphically represented formula:

(R meaning a halogen substituted benzene nucleus) in conjunction with a suitable vehicle, substantially as described.

4. A coating material comprising the anhydrid of oxymercuric-ortho-chlor-phenol of the graphically represented formula:

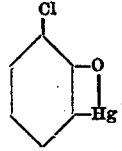

in conjunction with a suitable vehicle, substantially as described.

In testimony whereof we have hereunto set our hands in the presence of two subscribing witnesses.

DR. WALTER SCHOELLER.
DR. WALTHER SCHRAUTH.

Witnesses:
WOLDEMAR HAUPT,
HENRY HASPER.